(12) United States Patent
Liu et al.

(10) Patent No.: US 10,747,598 B2
(45) Date of Patent: Aug. 18, 2020

(54) SYNCHRONIZATION OF MESSAGES BASED ON QUEUES

(71) Applicant: Beijing Yi Zhang Yun Feng Technology Co., Ltd., Beijing (CN)

(72) Inventors: Junyan Liu, Beijing (CN); Xiaoyu Ma, Beijing (CN); Yupeng Liang, Beijing (CN); Chunye Wang, Beijing (CN); Qian Huang, Beijing (CN)

(73) Assignee: Beijing Yi Zhang Yun Feng Technology Co., Ltd., Beijing (CN)

( * ) Notice: Subject to any disclaimer, the term of this patent is extended or adjusted under 35 U.S.C. 154(b) by 0 days.

(21) Appl. No.: 16/305,823

(22) PCT Filed: Jun. 1, 2016

(86) PCT No.: PCT/CN2016/084282
§ 371 (c)(1),
(2) Date: Nov. 29, 2018

(87) PCT Pub. No.: WO2017/206101
PCT Pub. Date: Dec. 7, 2017

(65) Prior Publication Data
US 2019/0303224 A1 Oct. 3, 2019

(51) Int. Cl.
*G06F 9/54* (2006.01)
*H04L 12/58* (2006.01)

(52) U.S. Cl.
CPC ............. *G06F 9/546* (2013.01); *H04L 51/04* (2013.01); *H04L 51/16* (2013.01); *H04L 51/34* (2013.01);
(Continued)

(58) Field of Classification Search
CPC ............... G06F 9/546; G06F 2209/548; G06F 2209/547; H04L 51/16; H04L 51/34
See application file for complete search history.

(56) References Cited

U.S. PATENT DOCUMENTS

| 5,841,973 A | 11/1998 | Kessler et al. |
| 5,887,134 A | 3/1999 | Ebrahim |

(Continued)

FOREIGN PATENT DOCUMENTS

| CN | 101442458 A | 5/2009 |
| WO | WO-2017206101 A1 | 12/2017 |

OTHER PUBLICATIONS

"International Application Serial No. PCT/CN2016/084282, International Search Report dated Mar. 7, 2017", 4 pgs.
(Continued)

*Primary Examiner* — Charles E Anya
(74) *Attorney, Agent, or Firm* — Schwegman Lundberg & Woessner, P.A.

(57) ABSTRACT

In various example embodiments, a system and method for synchronization of messages based on queues are presented. One or more electronic messages are received according a message order. A message queue that corresponds to the first user is generated. The one or more messages in the message queue are stored based on the received message order. A position of a next message in the generated message queue to be transmitted is determined. The message from the determined position in the message queue is transmitted to the client device operated by the first user.

18 Claims, 14 Drawing Sheets

(52) U.S. Cl.
CPC .. *G06F 2209/547* (2013.01); *G06F 2209/548* (2013.01)

(56) References Cited

U.S. PATENT DOCUMENTS

| | | | |
|---|---|---|---|
| 10,230,670 B1* | 3/2019 | Cui ........................ | H04L 51/30 |
| 2010/0070588 A1* | 3/2010 | Sinn ....................... | H04L 51/04 |
| | | | 709/206 |
| 2011/0193699 A1* | 8/2011 | Van Acht .......... | A63B 24/0006 |
| | | | 340/540 |
| 2012/0297316 A1* | 11/2012 | Ercegovic ........... | G06Q 10/107 |
| | | | 715/752 |
| 2013/0044583 A1* | 2/2013 | Chuang ............... | G06F 16/2428 |
| | | | 370/216 |
| 2013/0324142 A1 | 12/2013 | Kanamarlapudi et al. | |
| 2013/0339477 A1* | 12/2013 | Majeti .................... | H04L 67/02 |
| | | | 709/217 |
| 2015/0381709 A1* | 12/2015 | Word .................... | H04L 49/90 |
| | | | 709/203 |
| 2016/0277343 A1* | 9/2016 | Ji .......................... | H04L 51/04 |
| 2017/0214762 A1* | 7/2017 | Swain ................ | H04L 67/2842 |

OTHER PUBLICATIONS

"International Application Serial No. PCT/CN2016/084282, Written Opinion dated Mar. 7, 2017", 4 pgs.

\* cited by examiner

SYNCHRONIZATION OF MESSAGES BASED ON QUEUES

CROSS-REFERENCE TO RELATED APPLICATIONS

This application is a U.S. National Stage Filing under 35 U.S.C. § 371 from International Application No. PCT/US2016/084282, filed Jun. 1, 2016, and published as WO 2017/206101 A1 on Dec. 7, 2017, the entirety of which application is incorporated by reference as if fully set forth herein.

TECHNICAL FIELD

Embodiments of the present disclosure generally relates to the technical field of special-purpose machines that facilitate interaction with messaging systems including computerized variants of such special-purpose machines and improvements to such variants, and to the technologies by which such special-purpose machines become improved compared to other special-purpose machines that facilitate interactions with the messaging systems. Specifically, the present disclosure addresses systems and methods to managing and synchronizing messages based on generated message queues.

BACKGROUND

Conventionally, messages are exchanged between devices. Moreover, a server may be used to facilitate the exchange of the messages. However, often times, the messages being exchanged can be received out of order. For example, if a first device sends three messages to a second device, the second device may receive the three messages in a random order. Also, for messages that are dropped, conventionally, the server will have to resend the dropped message along with resending other messages associated with the dropped message.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

Example methods (e.g., algorithms) facilitate generation of message queues to store messages being sent to a client device, and example systems (e.g., special-purpose machines) are configured to facilitate generation of the message queues to store the messages being sent to the client device. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

In various example embodiments, a system generates message queues to store messages being sent to a client device. As messages are received by the system, the system stores the messages into the message queue based on a message order. In some instances, the message order is a chronological ordering of the messages. In further instances, the message order may vary. For example, the server can store the messages into the message queue based on a size of the messages or content included within the messages. Once the messages are stored in the message queue, the system determines a position of a message from the message queue and transmits the message from that position to the client device. Moreover, for messages that are dropped or not received by the client device, only the dropped message is transmitted to the client device without resending other associated data (e.g., other messages that are a part of a same communication) that have been received by the client device.

Accordingly, one or more of the methodologies discussed herein may obviate a need for resending the associated data already received by the client device, which may have the technical effect of reducing computing resources used by one or more devices within the system. Examples of such computing resources include, without limitation, processor cycles, network traffic, memory usage, storage space, and power consumption.

Figure 1:
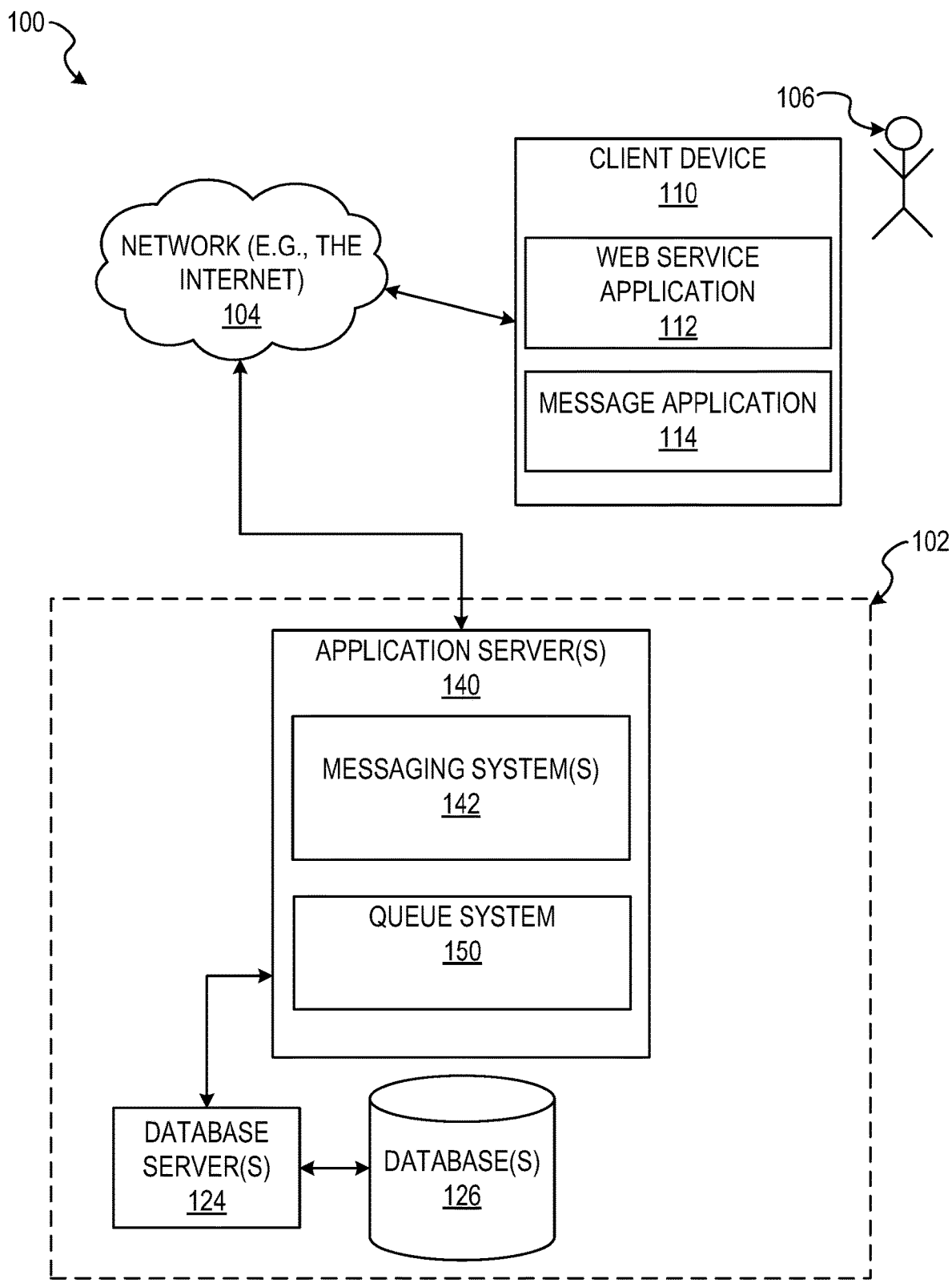
FIG. 1 is a block diagram illustrating a networked system, according to some example embodiments.

With reference to FIG. 1, an example embodiment of a high-level client-server-based network architecture 100 is shown. A networked system 102, in the example forms of a network-based messaging system, provides server-side functionality via a network 104 (e.g., the Internet, local area network (LAN), or wide area network (WAN)) to one or more client devices 110 that have access to the network 104. Moreover, FIG. 1 illustrates, for example, a web service application 112 (e.g., a web application that enables access to the web pages hosted over the Internet), and a message application 114 executing on client device 110.

A user 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 for presentation to the user 106. In this way, the user 106 can interact with the networked system 102 using the client device 110. Further, the user 106 may own or operate more than one client device (e.g., client device 110).

The client device 110 comprises, but is not limited to, a mobile phone, desktop computer, laptop, smart phones, tablets, multi-processor systems, microprocessor-based or programmable consumer electronics or any other communication device that a user may utilize to access the networked system 102. In some embodiments, the client device 110 includes components that are used to display information (e.g., in the form of user interfaces). In further embodiments, the client device 110 may comprise one or more of touch screens, accelerometers, gyroscopes, cameras, microphones, global positioning system (GPS) devices, and so forth. Moreover, although FIG. 1 only shows the client device 110, there may be multiple client devices included in the network architecture 100.

In one embodiment, the networked system 102 is a network-based messaging system that receives messages over the network 104 that are addressed to a user, maintains a queue for the received messages, and transmits the received messages to the user from the queue. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 104 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 110 has one or more applications that allow the client device 110 to participate with the network-based messaging system including, but not limited to, the message application 114 or an electronic mail application. The message application 114 provides functionality that enables the client device to communicate with a message server (e.g., a messaging system 142). In some embodiments, the message application 114 is also configured to perform operations locally on the client device 110. For instance, the message application 114 is configured to present a user interface that displays data received from communication with the server (e.g., messaging system 142).

Application servers 140 hosts the messaging system 142 and a queue system 150, each of which may comprise one or more modules, engines, or applications and each of which may be embodied as hardware, software, firmware, circuitry, or any combination thereof. The application servers 140 are, in turn, shown to be coupled to one or more database servers 124 that facilitate access to one or more information storage repositories or database(s) 126. In an example embodiment, the databases 126 are storage devices that store information communicated (e.g., messages addressed to a user) between the messaging system 142 and other components or devices.

The queue system 150 ensures that messages are transmitted to the client device 110 according to a message order. As further explained below, the message order can be determined using various factors. The queue system 150 generates and stores a message queue in a database, such as database 126. Moreover, messages are stored and maintained in the message queue based on the message order. During communication with the client device 110, a message is retrieved from the message queue and transmitted to the client device according to the message order. Effectively, the user 106 of the client device 110 receives the messages for display on the client device 110 according to the message order.

In some example embodiments, the queue system 150 communicates with the messaging system 142 (e.g., accessing messages from the database 126). In an alternative embodiment, the queue system 150 and the messaging system 142 may be combined into a single system.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 14, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

Figure 2:
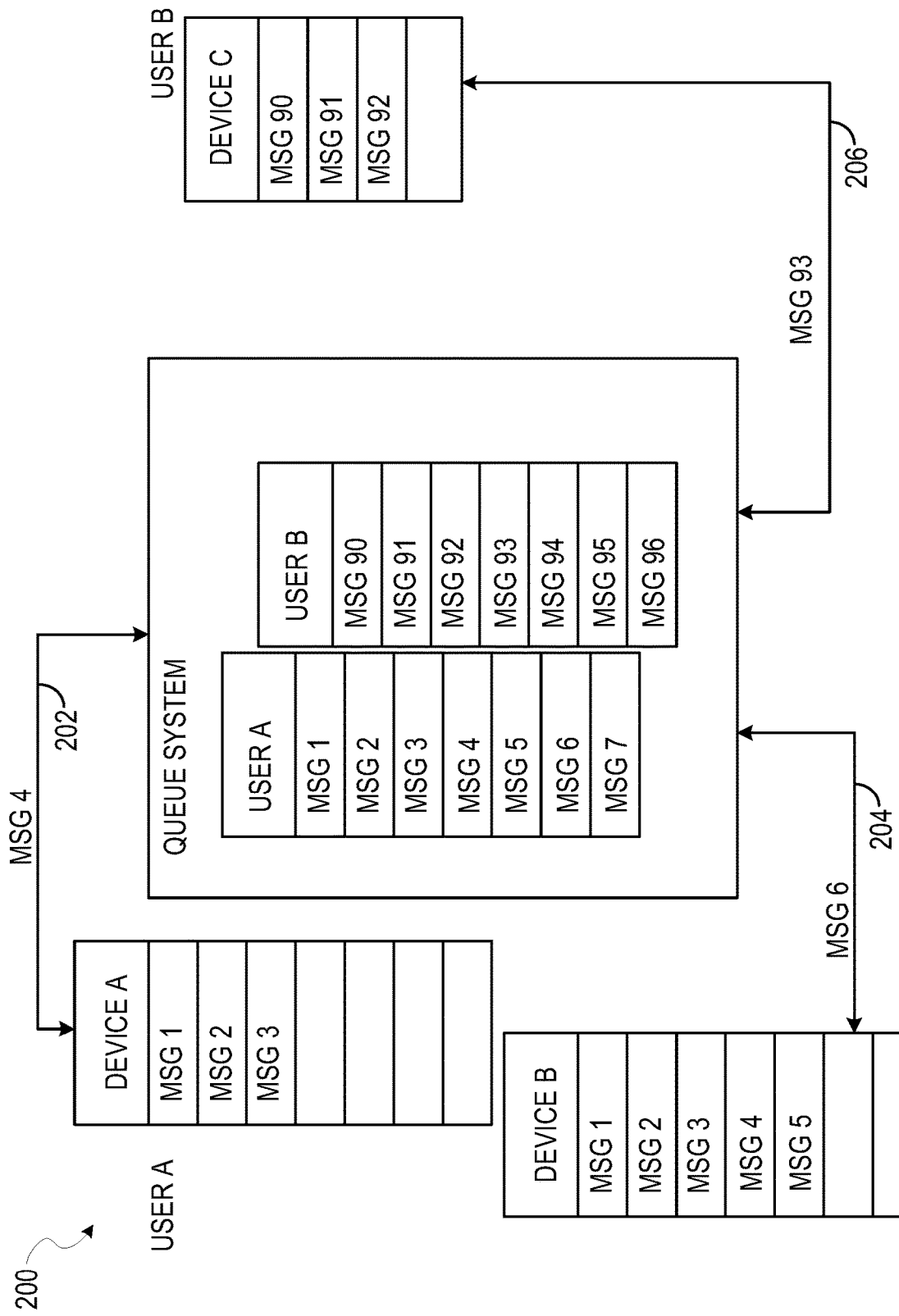
FIG. 2 is a block diagram illustrating an example data flow between one or more client devices and a queue system, according to some example embodiments.

FIG. 2 is a block diagram 200 illustrating an example data flow between one or more client devices and a queue system, according to some example embodiments. The queue system may correspond to the queue system 150 of FIG. 1. As shown, the queue system includes two message queues, one for a user A and one for a user B. Moreover, each of the message queues stores messages for a respective user (e.g., user A or user B). Also shown in FIG. 2 are devices A, B, and C. Devices A and B belong to user A. Device C belongs to user B. Device A is shown as having received the first three messages from the message queue for user A. As a result, a fourth message, depicted by line 202, is being transmitted to the device A. Device B is shown as having received the first five messages from the message queue for user A. As a result, a sixth message, depicted by line 204, is being transmitted to the device B. As such, the message queue for a user can provide same messages to multiple devices of the same user. The queue system 150 is configured to identify a position of a current message in the message queue to be transmitted to each of the multiple devices. Also shown in FIG. 2 is a ninety-third message, depicted by line 206, as being transmitted to the device C. Each user of the queue system may have a corresponding message queue.

Figure 3:
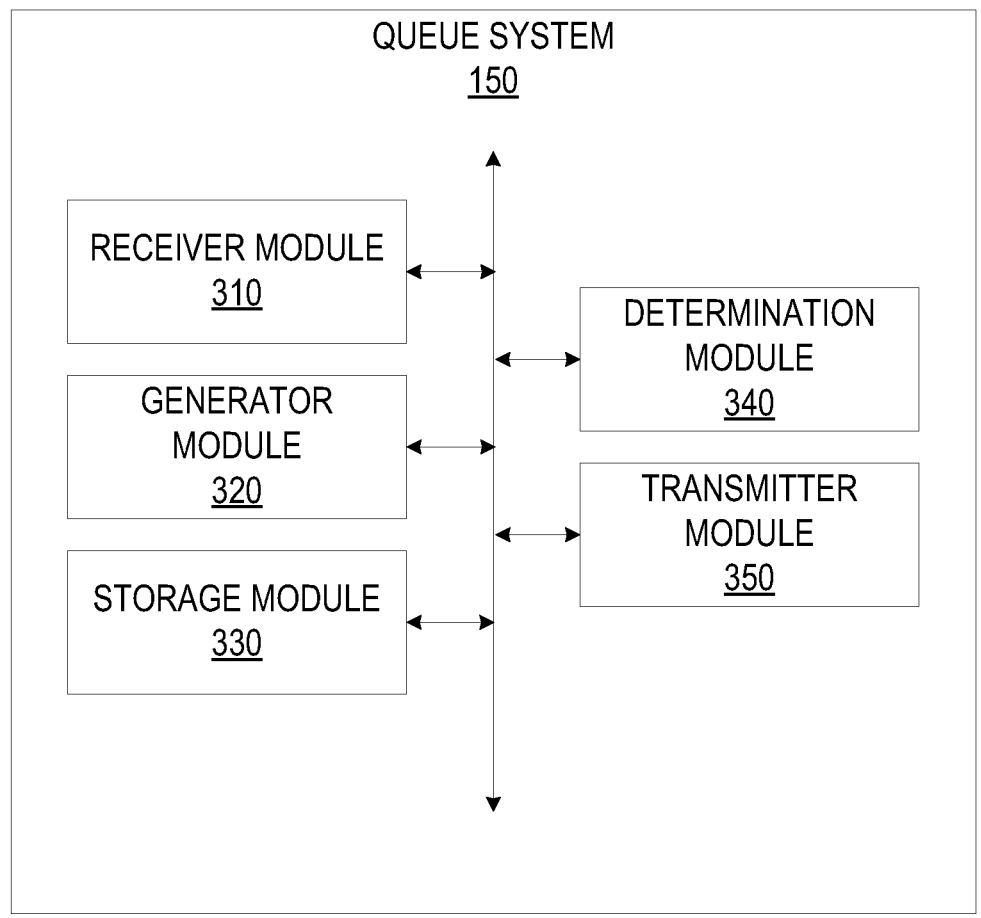
FIG. 3 is a block diagram illustrating components of the queue system, according to some example embodiments.

FIG. 3 is a block diagram illustrating components of the queue system 150, according to some example embodiments. The queue system 150 is shown as including a reception module 310, a generator module 320, a storage module 330, a determination module 340, and a transmitter module 350 all configured to communicate with each other (e.g., via a bus, shared memory, or a switch). Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various example embodiments, the receiver module 310 is configured to receive one or more electronic messages that are addressed to a first user. In some embodiments, the one or more messages are sent to the first user through a messaging service or application. For example, the one or more messages may be sent to the first user as part of an instant messaging application. Moreover, in some instances, the instant messaging application is hosted by the messaging system 142, which is included in the application server 140 of FIG. 1. In some instances, the one or more messages addressed to the first user includes any combination of images, text, or video. For example, messages sent over the instant messaging application may include words or phrases that are directed to the first user. As another example, a message sent over the instant messaging application may include a set of images for the first user to view.

In various example embodiments, the one or more electronic messages addressed to the first user are received by the receiver module 310 according to a message order. The message order, in some instances, is chronological. In other words, the message order matches the order in which the messages are created or received. In this regard, the received messages may each be time stamped based on a time of creation (e.g., time of composition). As another example, the received messages may each be time stamped based on a time of receipt by the receiver module 310. In this regard, the order in which the messages are received by the receiver module 310 matches the order in which the messages are time stamped (e.g., the message order).

In some instances, the order in which the one or more electronic messages are received does not match the message order in which the messages are time stamped (e.g., the message order). For example, the message order is disrupted based on a delayed receipt of the message by the receiver module 310. To correct the disruption, the messages are sorted by the receiver module 310 according to the time stamps in order to achieve the correct message order.

In example embodiments, the receiver module 310 is configured to receive an electronic message that is addressed to the first user from an electronic device operated by a second user. In other words, the receiver module 310 receives any of the one or more messages from devices operated by other users of the instant messaging application hosted by or associated with the messaging system 142. The devices may each have a client component of the instant messaging application (e.g., the message application 114) installed thereon which allows for messages to be received from the respective devices through the instant messaging application. Moreover, the devices may execute the client component of the instant message application in order to communicate with the messaging system 142.

In various example embodiments, the receiver module 310 receives a queue synchronization request from a client device of a recipient user. The request from the client device indicates, in some instances, that the client device is ready to receive messages from the queue system 150.

In various example embodiments, the generator module 320 is configured to generate (or update) a message queue that corresponds to the first user. The generated message queue stores the messages addressed to the first user (e.g., indicate the first user as a recipient) that are received by the receiver module 310. Accordingly, in various example embodiments, the generated message queue is specific to the first user. For each user that receives messages from the messaging system 142, the generator module 320 generates a respective messaging queue for that user. In some instances, the generated message queue is a data structure that is capable of storing the messages that are addressed to the first user in a particular order.

In various example embodiments, the generator module 320 is further configured to generate a label, as further explained below. As also further explained below, in some embodiments, the determination module 340 determines a position for transmission from the message queue.

In various example embodiments, the storage module 330 is configured to store the one or more messages in the message queue based on the received message order. In some instances, the storage module 330 loads or aggregates each of the one or more messages into the message queue based on time stamps assigned to the one or more messages. As stated earlier, the received messages may each be time stamped during creation (e.g., when they are generated or composed by the messaging application 114 on a sender client device). Alternatively, the message may each be time stamped as they are received by the receiver module 310. In either event, the message order can be indicated by the time stamps.

In various example embodiments, the determination module 340 is configured to determine a position of a next message in the generated message queue to be transmitted to a client device. In other words, the determination module 340 determines the position of a message in the message queue that has not been transmitted to the client device operated by the first user. Moreover, the message may be a foremost message that precedes all other remaining non-transmitted messages in the message queue.

In various example embodiments, the transmitter module 350 is configured to transmit the message based on the determined position in the message queue to the client device operated by the first user. In further embodiments, the transmitter module 350 is configured to cause display of a trigger that is selectable by the user of the client device. The trigger is selectable by the user to confirm whether one or more messages previously transmitted by the queue system 150 were received by the client device, as further explained below. Moreover, the transmitter module 350 is further configured to transmit (e.g., retransmit) any previously transmitted messages that are not received by the client device (e.g., as indicated by the trigger). In further embodiments, the transmitter module 350 is configured to transmit only a message that was not received by the client device, without retransmitting any other messages that the client device has already received, as further explained below.

Figure 4:
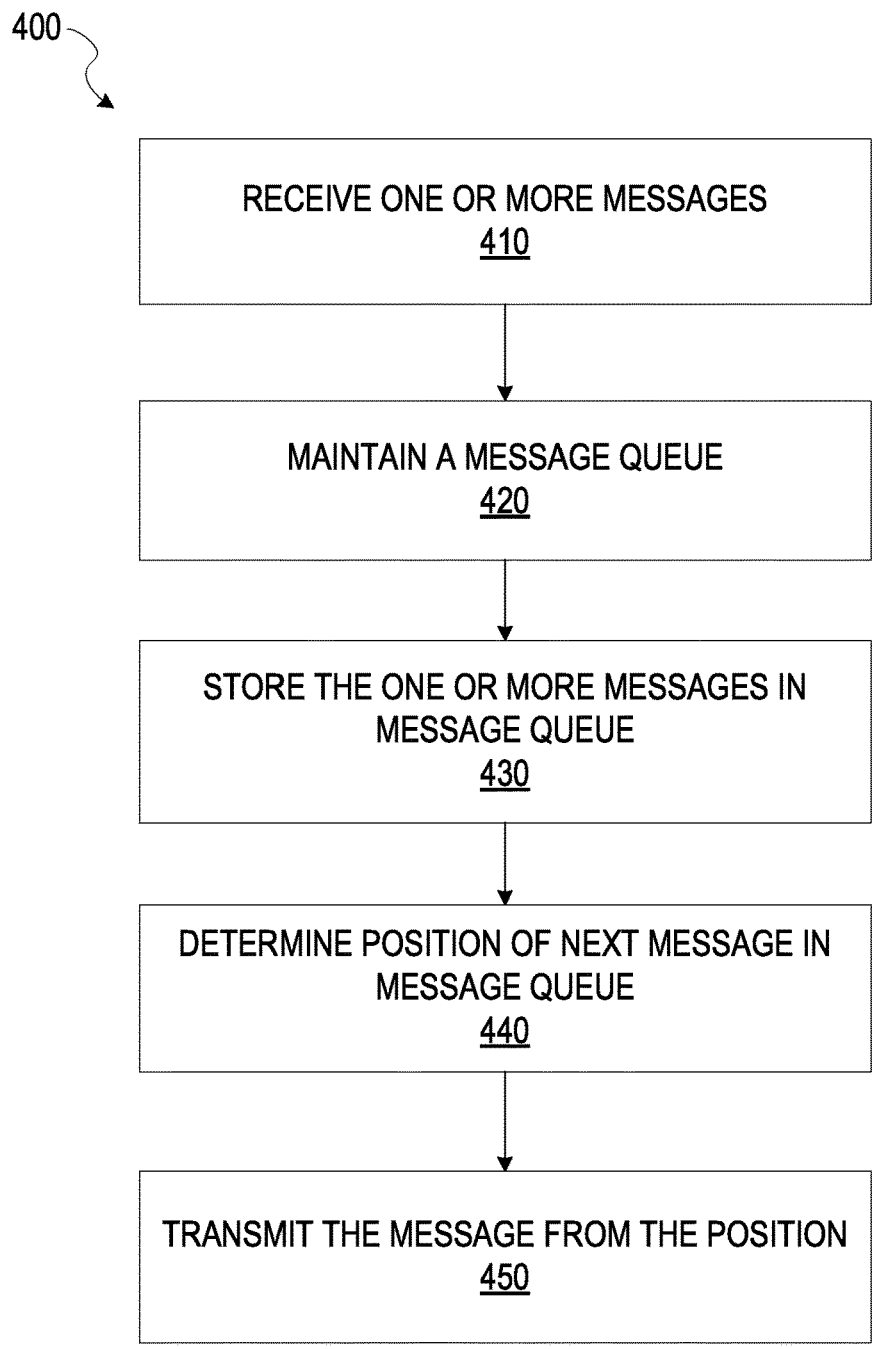
FIG. 4-6 are flowcharts illustrating operations of the queue system, according to some example embodiments.
Figure 5:
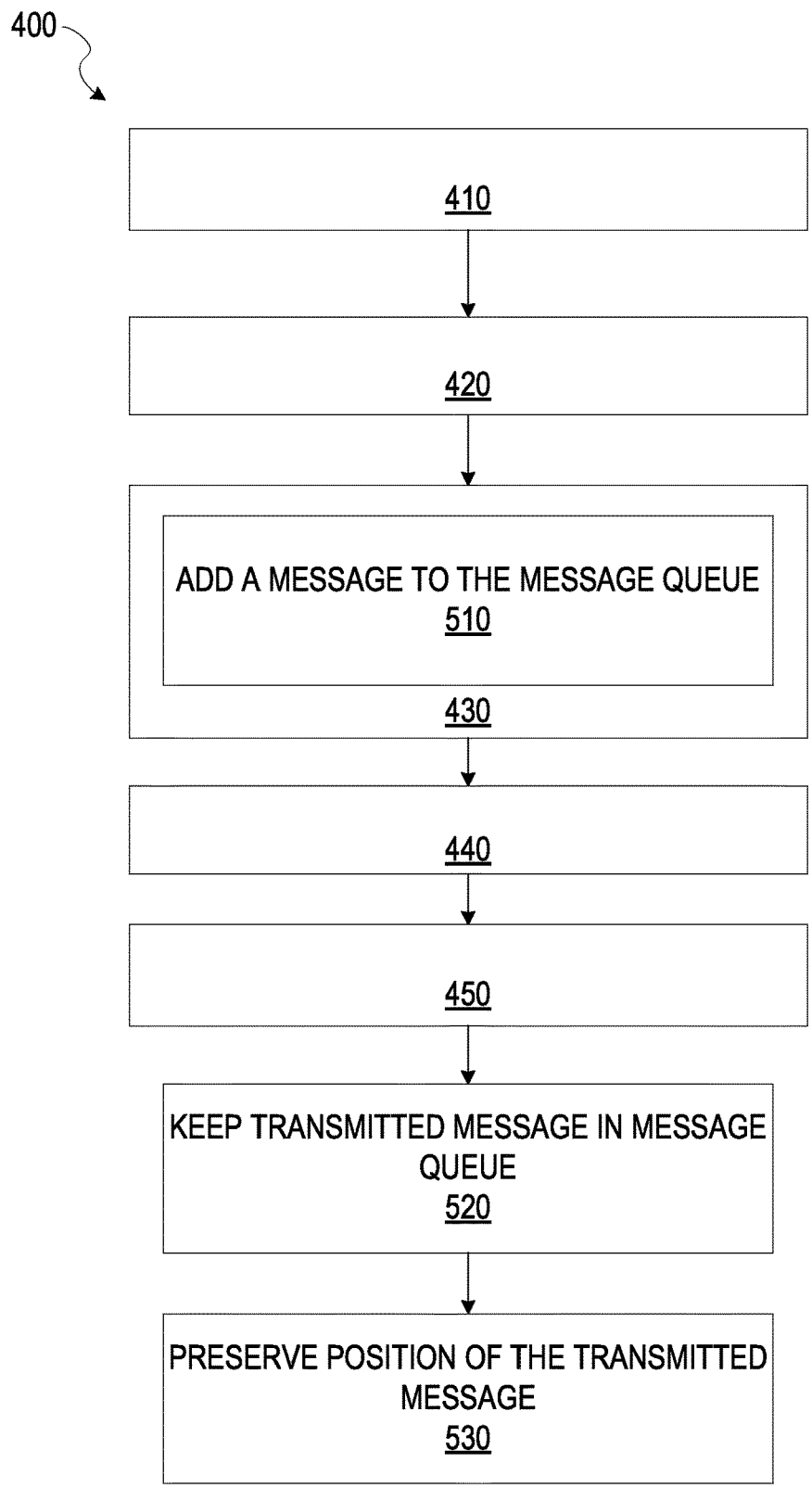
Figure 6:
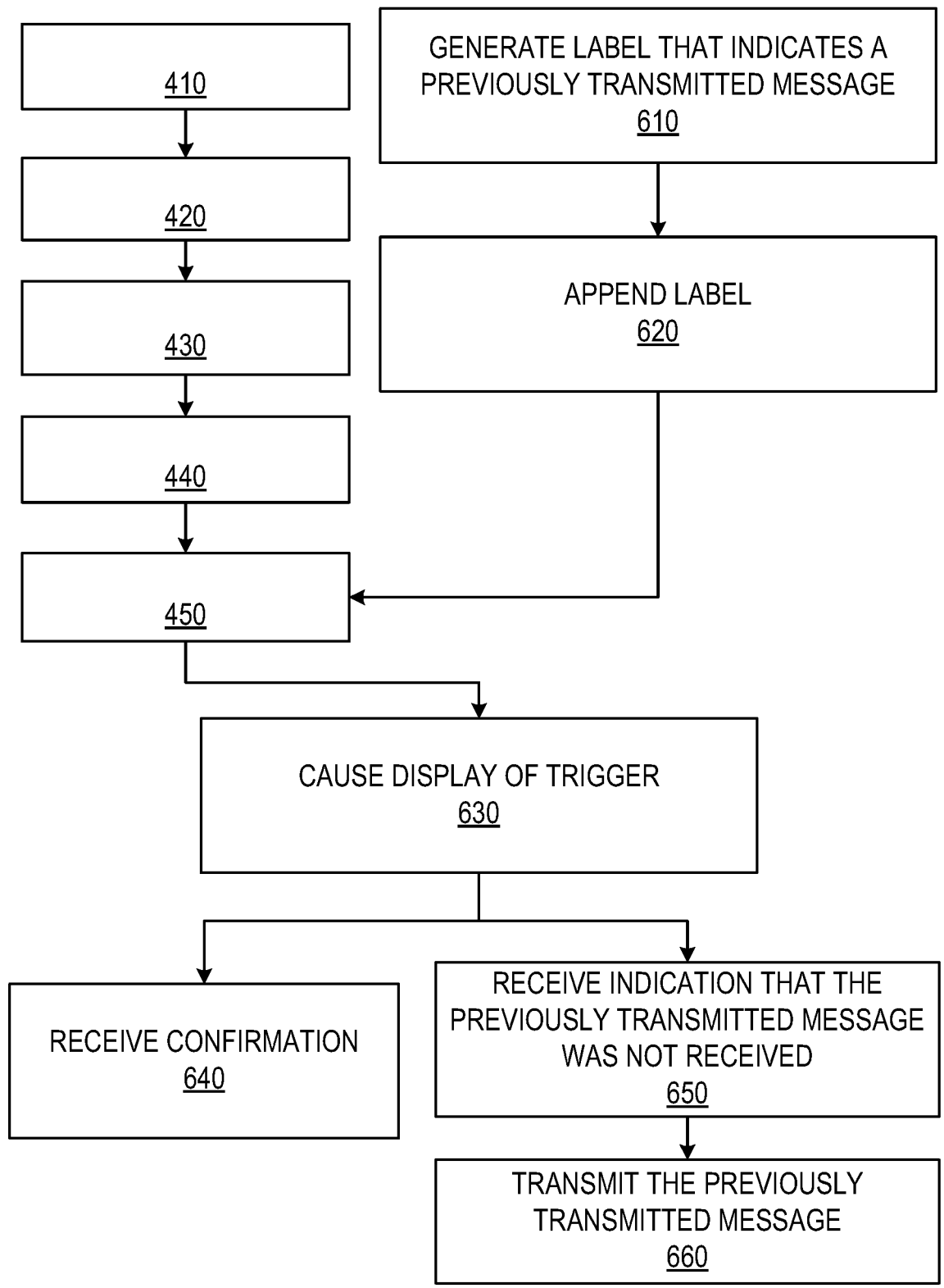

FIG. 4-6 are flowcharts illustrating operations of the queue system 150 in performing a method 400 of transmitting a message, according to some example embodiments. Operations in the method 400 may be performed in part or in whole by components of the queue system 150, which can be embodied either in whole or in part in one or more application servers 140 of a networked system 102 using components described above with respect to FIG. 3. Accordingly, the method 400 is described by way of example with reference to the queue system 150. However, it shall be appreciated that at least some of the operations of the method 400 may be deployed on various other hardware configurations or be performed by similar components residing elsewhere in the network architecture 100. Therefore, the method 400 is not intended to be limited to the queue system 150. As shown in FIG. 4, the method 400 includes operations 410, 420, 430, 440, and 450.

At operation 410, the receiver module 310 receives one or more electronic messages according in a particular message order, the one or more messages being addressed to a user. As discussed above, the one or more messages may be sent to the user through a messaging service. Moreover, the one or messages are received from one or more client devices (e.g., device 110) operated by other users of the messaging service. In some instances, the messaging service is hosted by the messaging system 142. Example messaging services include instant messaging, email, text, and the like. In the case of instant messaging, the messages are sent to an account that the user has registered with the messaging service. In some instances, the account of the user is an alias or nickname associated with the user. In further instances, the account of the user is linked to a phone number of a mobile device, an email address, or any information that uniquely identifies the user. Messages addressed to the user, in some instances, indicate the account that the user has registered with the messaging service.

Moreover, the messages are received at the receiver module 310 according to the message order. As discussed above, in some instances, the message order is chronological and therefore matches the order in which the messages are time stamped. As discussed above, in various example embodiments, the receiver module 310 generates a time stamp for a message once it is received. In further embodiments, the messages are time stamped based on a time of creation (e.g., composition) for each of the messages. Accordingly, the messages are sorted by the receiver module 310 based on the time stamps for the messages.

In further example embodiments, the message order is determined based on other factors. For example, size of the message or content included in the message may also be used to determine the message order. In this regard, the receiver module 310 is configured to sort the messages based on the size of the message or the content included in the message (e.g., images, text, or video).

At operation 420, the generator module 320 maintains a message queue that corresponds to the user. In some instances, the generation module 230 generates a message queue that corresponds to the user. As stated earlier, the message queue, in some instances, is a data structure that is capable of storing the messages that are addressed to the user. Moreover, the generated message queue is specific to the user. Accordingly, each user of the messaging service has a respective message queue that is generated by the generator module 320. Messages addressed to the user are stored in the message queue. In further instances, a message queue already exists for the user, and therefore, the message queue for that particular user is identified and updated with the new messages. In some instances, the message queue comprises one or more rows, and each message that is stored in the message queue occupies a row in the message queue. In example embodiments, the generated message queue is stored in a database (e.g., database 126) which is accessible by the queue system 150.

At operation 430, the storage module 330 stores the one or more messages in the message queue based on the received message order. In some embodiments, each of the messages stored in message queue occupies a row or a position in the message queue. Moreover, each row in the message queue may be labeled with a row number. As a result, a row number of a row that contains a stored message indicates a position of that stored message. Moreover, if the message order is chronological, the storage module 330 parses the time stamps for the one or more messages so that the messages are stored in the message queue chronologically. In further example embodiments, the storage module 330 stores the one or more messages in the message queue after they have been sorted by the receiver module 310, as discussed above. In some embodiments, operations 420 and 430 may be combined into a single operation or occur substantially simultaneously.

At operation 440, the determination module 340 determines a position of a next message in the generated message queue to be transmitted. In various example embodiments, if the user is operating multiple client devices, the position of the next message to be transmitted can vary among the multiple client devices. In other words, the position of the next message to be transmitted is specific to each device operated by the user. In various example embodiments, the determined position in the generated message queue is the position of a next message based on timestamps that has not been transmitted to that specific device operated by the user. For example, the user may be operating two separate devices, such as a first device and a second device. The first device operated by the user may have received more messages from the message queue than the second device. For instance, the determination module 340 determines that the first device received ten messages from the message queue whereas the second device only received five messages from the message queue. As a result, a position of a next message to be sent or transmitted to the first device is different from a position of a next message to be transmitted to the second device. In example embodiments, the operation 440 (e.g., the determining the position of the message) is performed in response to the queue synchronization request from the client device.

At operation 450, the transmitter module 350 transmits the next message from the determined position in the message queue to the client device operated by the user. Once the message is transmitted by the transmitter module 350, the message is caused to be displayed on a user interface of the client device. In various example embodiments, if there are still messages in the message queue that have not been transmitted to the client device, the method 400 cycles back to the operation 440. Once all of the messages in the message queue have been transmitted to the client device, the client device is fully synced with the messages in the message queue. Moreover, the client device receives the messages according to the message order.

As shown in FIG. 5, the method 400 may include one or more of operations 510, 520, and 530. At operation 510, the storage module 330 adds a new message to the message queue. The new message, in some instances, is received from a second client device operated by a second user and the new message is addressed to the first user. The second user composes the message using a message application (e.g., message application 114) running on the second client device. The new message is stored into a position in the message queue after a message previously stored into the message queue. In other words, an incoming message that has not been stored in the message queue will be stored by the storage module 330 into the message queue. Moreover, for instances in which the messages are stored in the message queue chronologically, the new message occupies a position in the message queue that comes after a message previously stored into the message queue (e.g., based on a timestamp). In further instances, the messages are stored into the message queue based on the other various factors (e.g., message size, message content, and the like).

At operation 520, the storage module 330 maintains a transmitted message in the message queue. In other words, after the transmitter module 350 transmits the message at operation 450, the storage module 330 does not discard the transmitted message from the message queue. In various example embodiments, the storage module 330 maintains a copy of the transmitted message in the message queue. Moreover, copies of the transmitted messages are kept in the message queue such that they are available for transmission to another device operated by the user. For example, if another device operated by the user has not yet received the message, the kept message can be transmitted to that device as well. Further still, the message may need to be retransmitted if it was not received by the client device.

At operation 530, the storage module 330 preserves a position of the transmitted message in the message queue (e.g., preserves an order to the message queue). As a result of maintaining the transmitted message in the message queue at the operation 520, the storage module 330 preserves the position of the transmitted message in the message queue. In other words, the message does not lose its position in the message queue after being transmitted. In the example of the message queue comprising rows, the transmitted message occupies the same row even after being transmitted to the client device of the user. In some instances, the messages are maintained in the message queue for a predetermined period of time (e.g., month, or year), which can be adjusted.

As shown in FIG. 6, the method 400 may include one or more of operations 610, 620, 630, 640, 650, and 660.

At operation 610, the generator module 320 generates a label that indicates at least one previously transmitted message that should have been received by the client device. In other words, the generated label indicates one or more messages that precede the determined position in the message queue of a next message to be sent.

At operation 620, the storage module 330 appends the label to the message from the determined position in the message queue. Moreover, when the message is transmitted at operation 450, it is transmitted with the appended label. That is, the transmitter module 350 transmits the generated label along with the message from the determined position.

At operation 630, the transmitter module 350 causes display of a trigger that is selectable by the user to confirm whether the previously transmitted message was received by the client device. The trigger, in some instances, is displayed in a user interface of the client device operated by the user. In further instances, the trigger may be selected by the user to acknowledge successful reception of the next message from the determined position in the generated message queue.

At operation 640, the receiver module 310 receives a confirmation that the previously transmitted message indicated in the label was received by the client device. The confirmation is received from the client device operated by the user. Moreover, the confirmation, in some instances, is received based on selection of the trigger displayed in the user interface of the client device. In various example embodiments, the receiver module 310 also receives an acknowledgement that the next message was successfully received by the client device.

Alternatively, at operation 650, the receiver module 310 receives an indication that the previously transmitted message has not been received by the client device. In one embodiment, the client device may access a cache or memory to discover that the previously transmitted message indicated in the label has not been received. That is, the client component of the messaging application installed on the client device may automatically determine that the previously transmitted message has not been received. As a result, the client device may transmit the indication to the receiver module 310 without the user having to activate the trigger. Alternatively, the client device transmits the indication to the receiver module 310 as a result of a selection by the user of the trigger displayed in the user interface. For example, the user may click on the trigger to inform the queue system 150 that the messages have not been received.

At operation 660, the transmitter module 350 transmits (or retransmits) the previously transmitted messages to the client device. Moreover, the previously transmitted message is transmitted to the client device without having to retransmit a subsequent message (e.g., the message from the determined position in the message queue that was sent with the label) or any other message (e.g., a preceding message).

Figure 7:
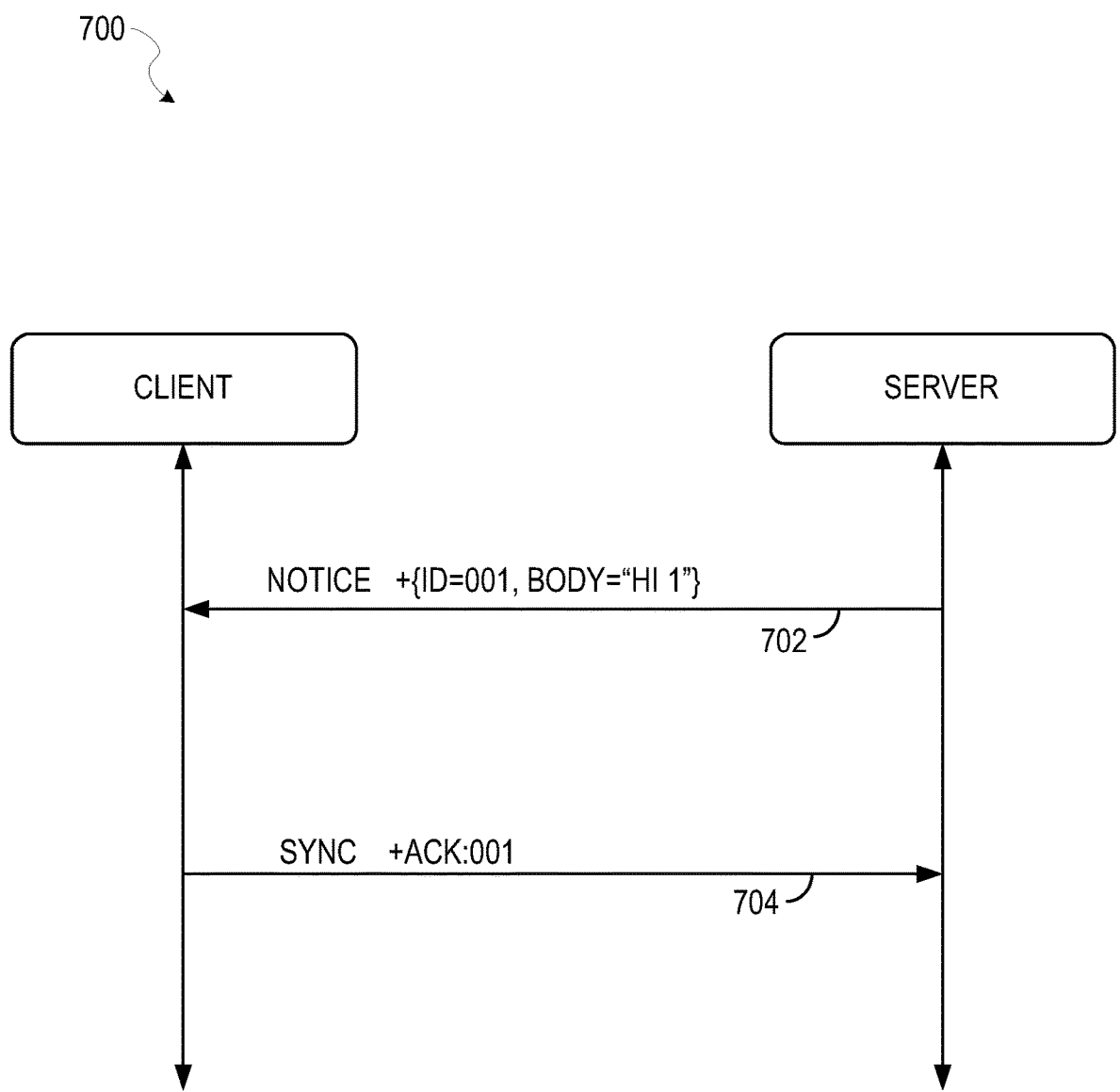
FIG. 7-9 are flow diagrams illustrating example data flow between a client device and a server, according to some example embodiments.

FIG. 7 is a communication flow diagram 700 illustrating an example data flow between a client device and the server (e.g., queue system 150), according to some example embodiments. As shown in FIG. 7, there are two example data flows as indicated by the horizontal arrowed lines. As indicated by the upper horizontal arrowed line 702, a label (e.g., notice) and a message is sent from the server to the client (e.g., client device). The message sent to the client corresponds to the message from the determined position in the message queue, as described above in the operation 450. As indicated by the lower horizontal arrowed line 704, the client sends an acknowledgement to the server indicating that the message is received by the client.

Figure 8:
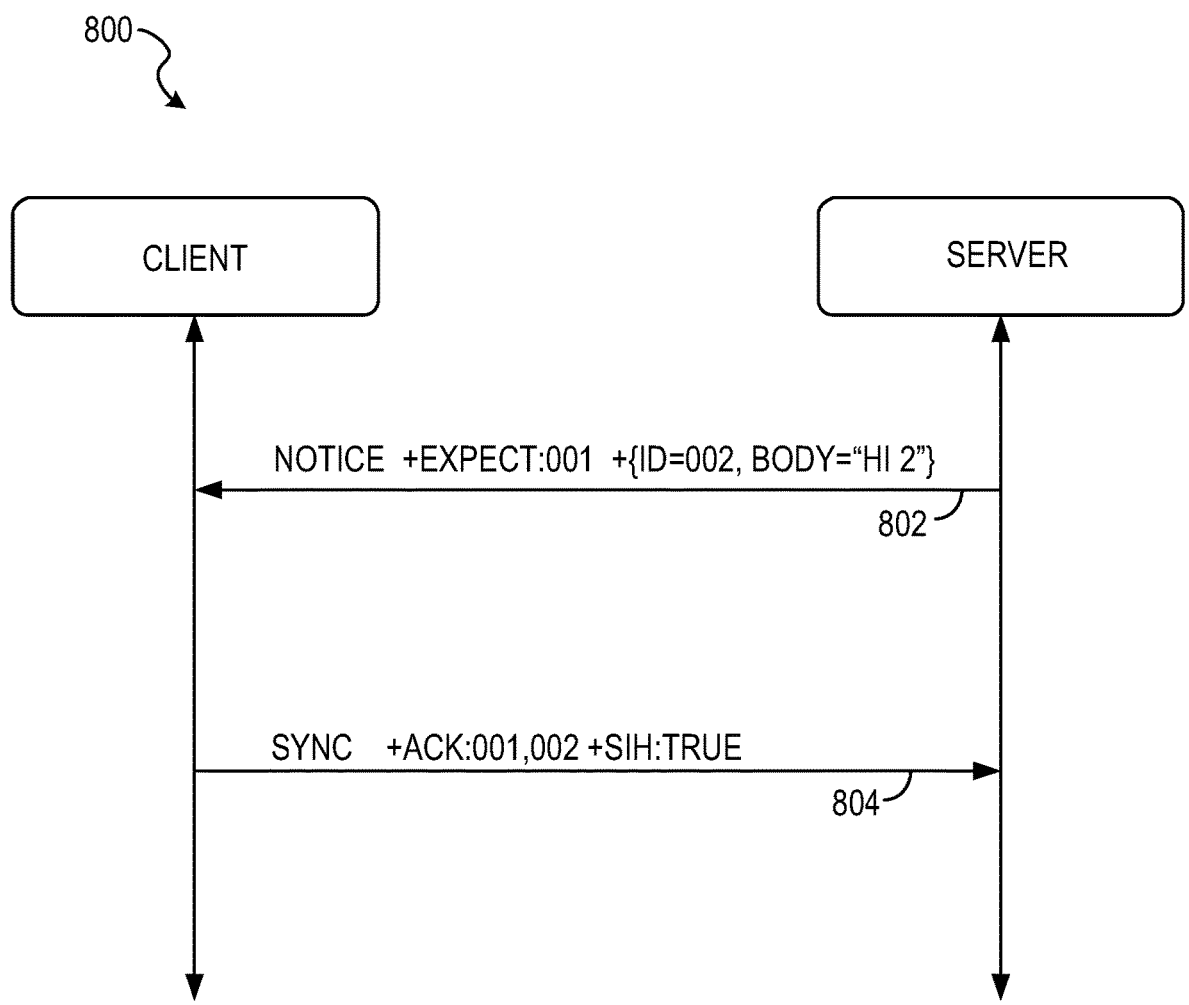

FIG. 8 is a communication flow diagram 800 illustrating an example data flow between a client device and a server (e.g., queue system 150), according to some example embodiments. As shown in FIG. 8, there are two example data flows as indicated by the horizontal arrowed lines. In the first horizontal line 802, a label (e.g., notice) and a message is sent from the server to the client. In this example, the message is a second message in the message queue, as indicated by the ID number two. Moreover, the body of the message includes "HI 2." Moreover, the label states that the server expects that the client received the first message in the message queue, as indicated by EXPECT 001.

In the second horizontal line 804, an acknowledgment is sent from the client device to the server. The acknowledgment states that the client received the second message in the message queue. Moreover, the client confirms that the EXCEPT 001 is true. In other words, the client confirms that the first message is also received. Moreover, the first horizontal line 802 and the second horizontal line 804 may correspond to the descriptions above with respect to operation 620 and the operation 640.

Figure 9:
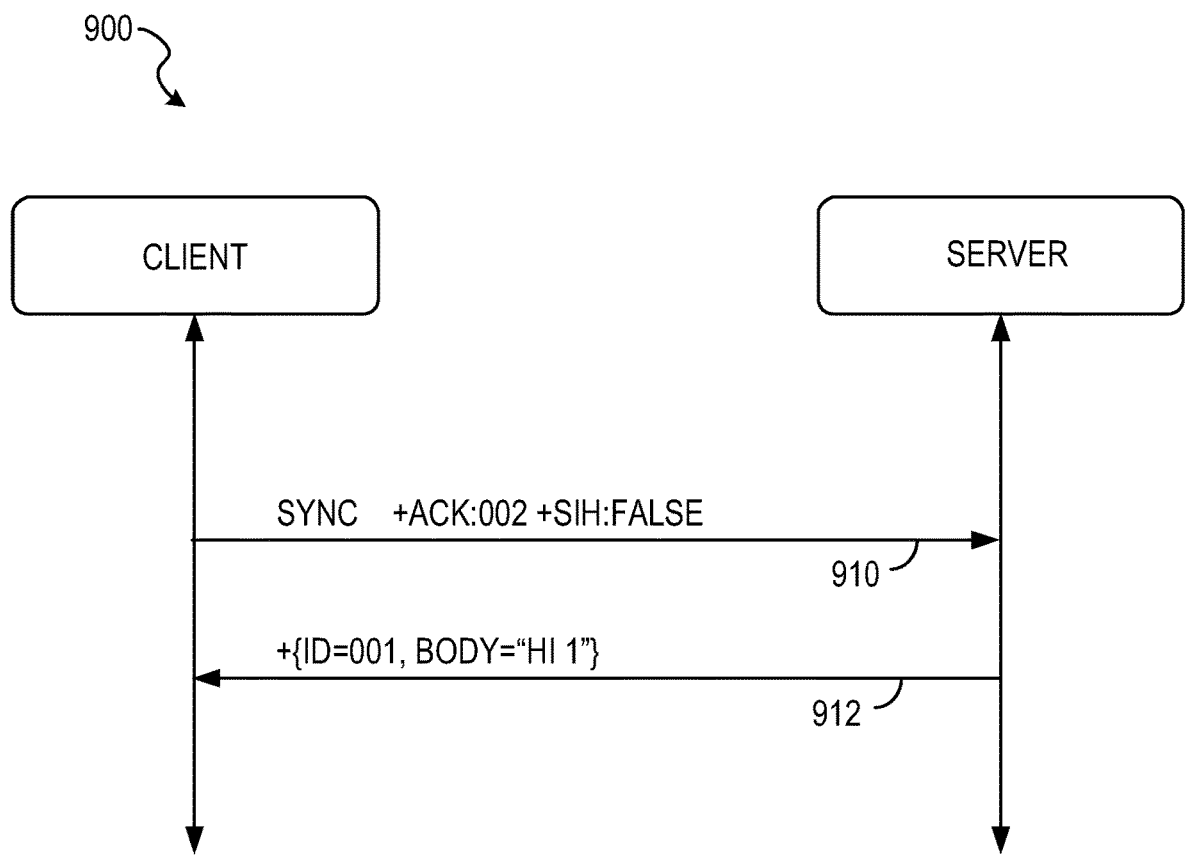

FIG. 9 is a communication flow diagram 900 illustrating an example data flow between a client device and a server (e.g., queue system 150), according to some example embodiments. As shown in FIG. 9, there are two example data flows as indicated by the horizontal arrowed lines. In the first horizontal line 910, an acknowledgement is sent from the client device to the server (e.g., queue system 150). The acknowledgement states that the client received the second message in the message queue. However, the client indicates that the first message has not been received yet from the server. The first horizontal line 910 corresponds to the operation 650.

In a second horizontal line 912, the first message from the message queue is sent to the client device. Moreover, the body of the message may include "HI 1." The second horizontal line 912 corresponds to the operation 660.

Figure 10:
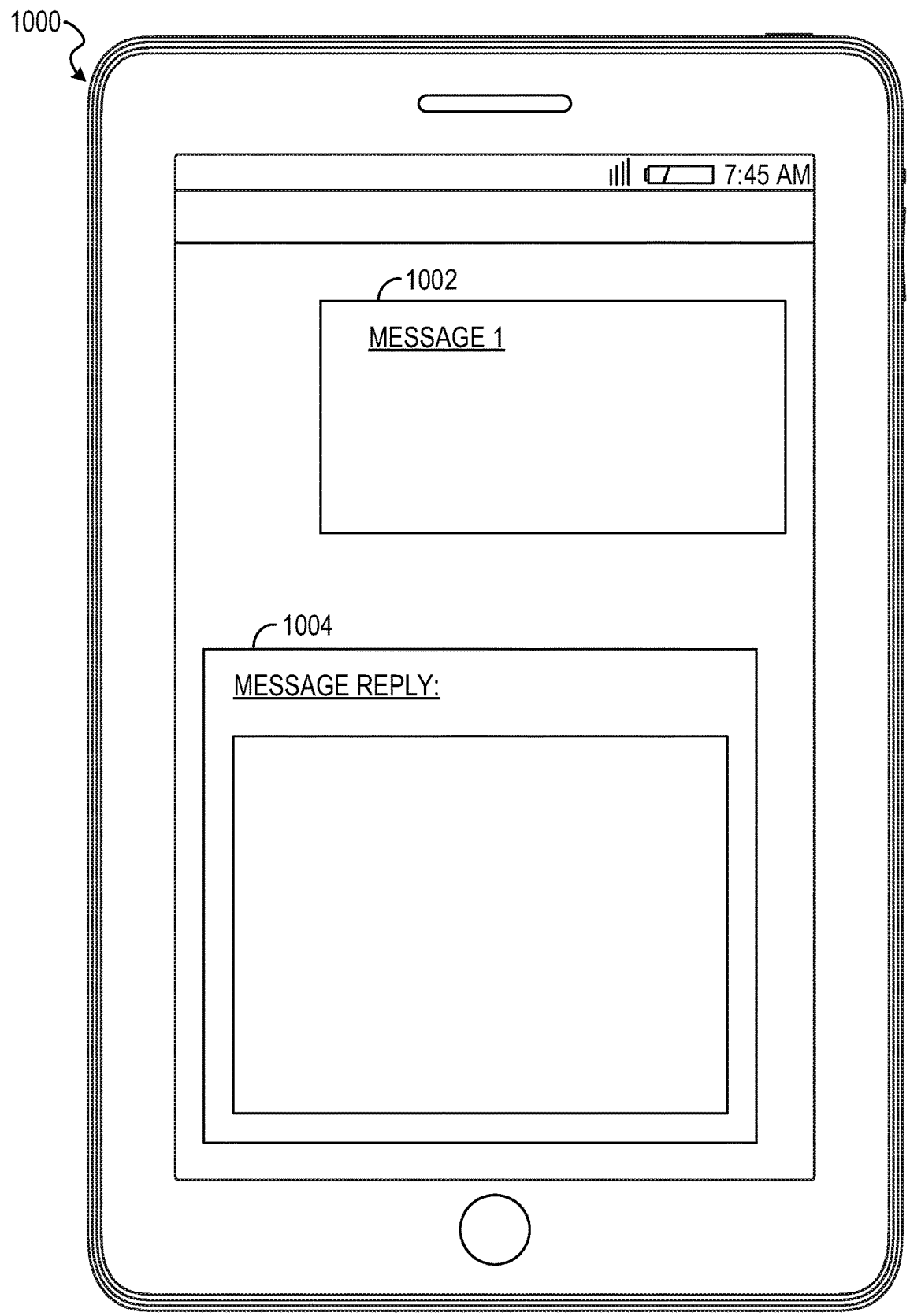
FIG. 10-13 are example user interfaces of a message application displayed on a client device, according to some example embodiments.

FIG. 10 is an example user interface 1000 of a messaging application that is displayed on a client device, according to some example embodiments. The example user interface 1000 includes a first message 1002 from the message queue. The first message 1002 is transmitted or caused to be displayed on the client device by the transmitter module 350. Moreover, the first message 1002, in some instances, is from a position of a next message in the message queue to be transmitted to the client device, as determined by the determination module 440. Also shown in the user interface 1000 is a reply section 1004 where the user can write a response to the first message 1002.

Figure 11:
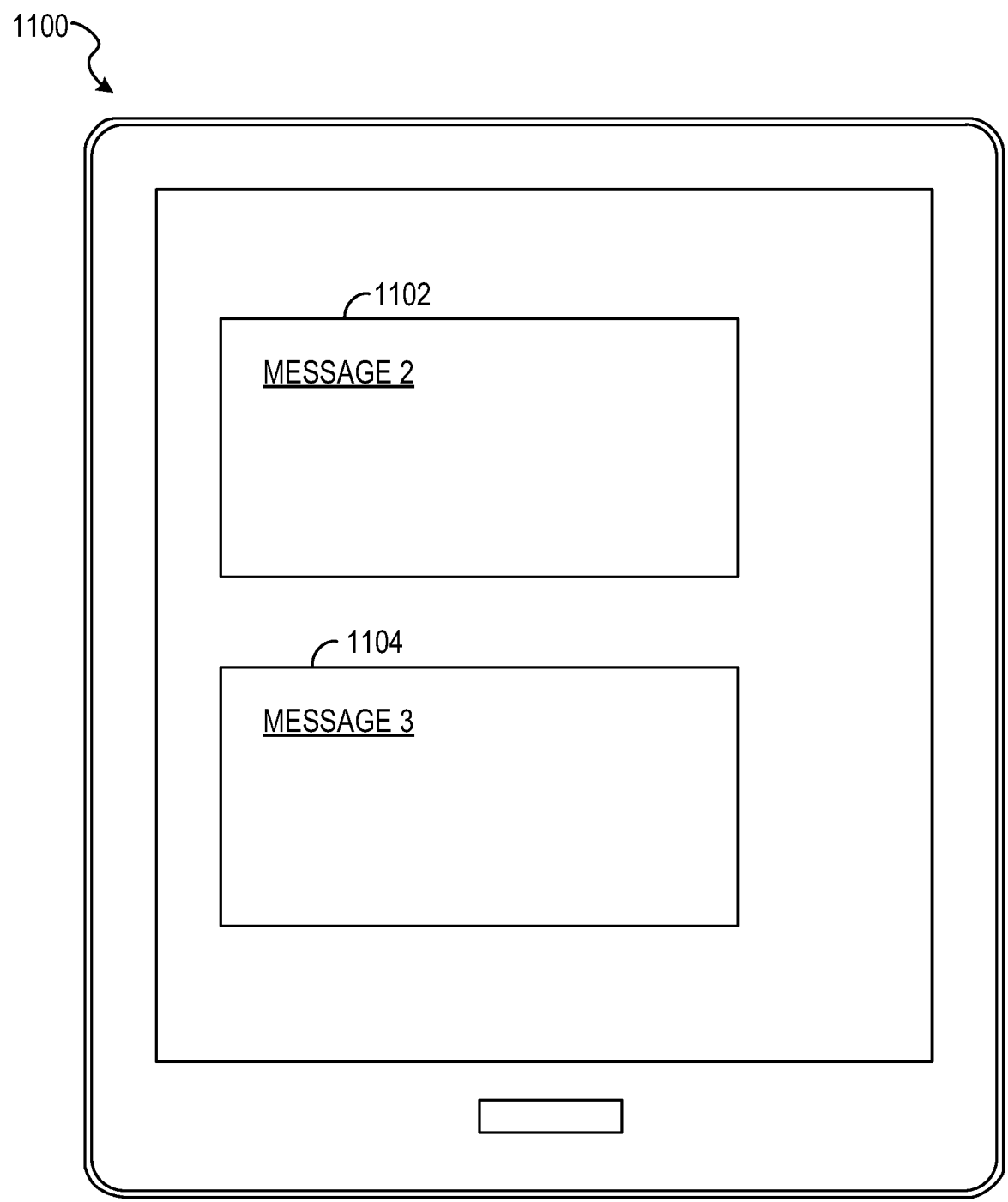

FIG. 11 is an example user interface 1100 of a messaging application that is displayed on a second client device, according to some example embodiments. As shown in FIG. 11, the example user interface 1100 displays a second message 1102 and a third message 1104 from the message queue. Moreover, in some instances, the second client device shown in FIG. 11 is not the same as the client device shown in FIG. 10. However both devices may be owned and operated by a same user. Moreover, the second message 1102 and the third message 1104 are each from positions of next messages in the message queue to be transmitted to the client device, as determined by the determination module 440. As stated before, the determined positions in the message queue may vary from device to device. However, the messages from the message queue are transmitted to each device such that all of the devices will receive all the messages according to the same message order.

Figure 12:
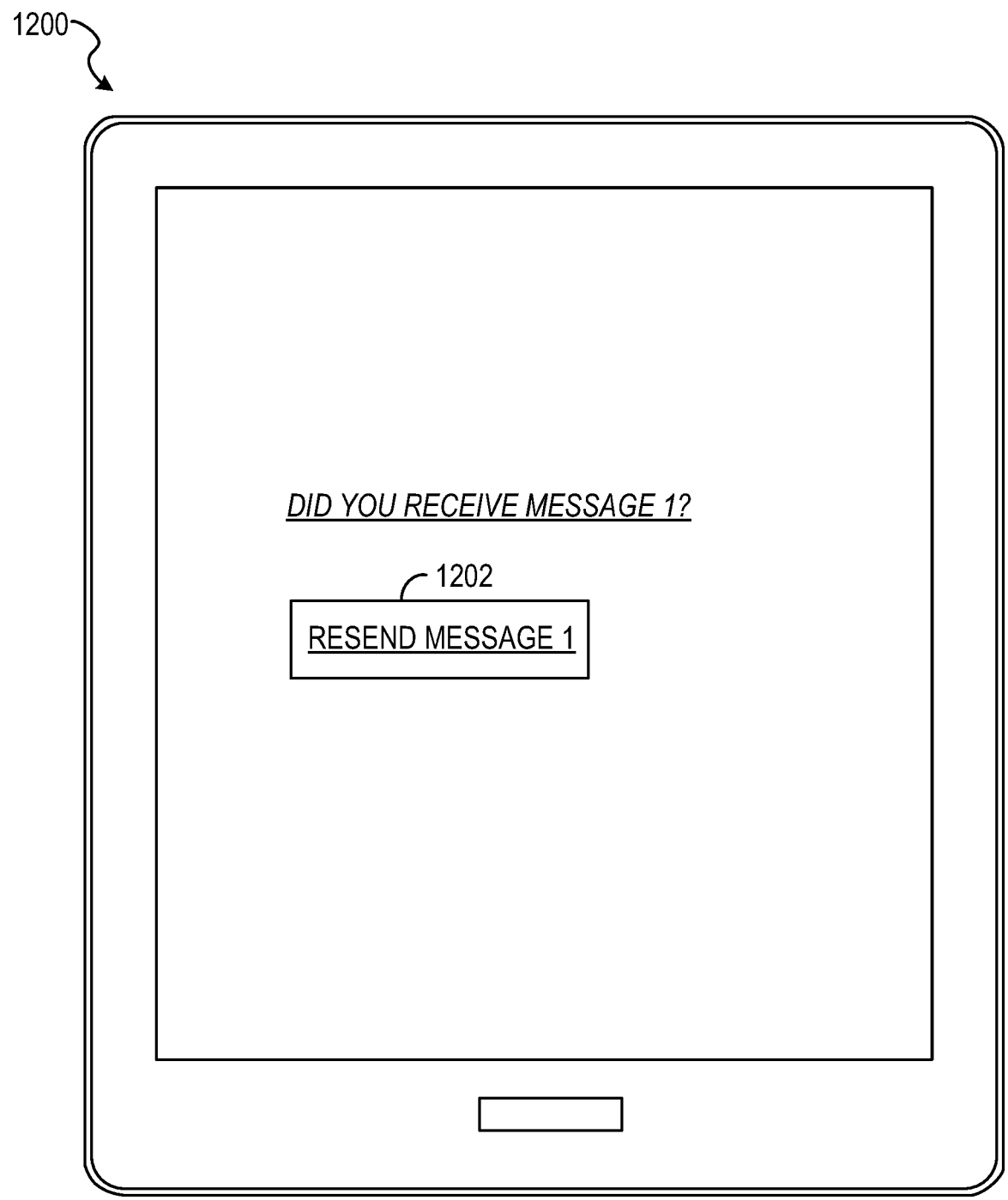

FIG. 12 is an example user interface 1200 of a messaging application that is displayed on a client device, according to some example embodiments. In various example embodiments, the example user interface 1200 is displayed on the client device after the example user interface 1100 is displayed. The user interface 1200 includes a trigger 1202 that is selectable to indicate that a first message has not been received by the client device. Once the trigger is selected 1202, an indication is sent to the queue system 150 to indicate that the first message was not received.

Figure 13:
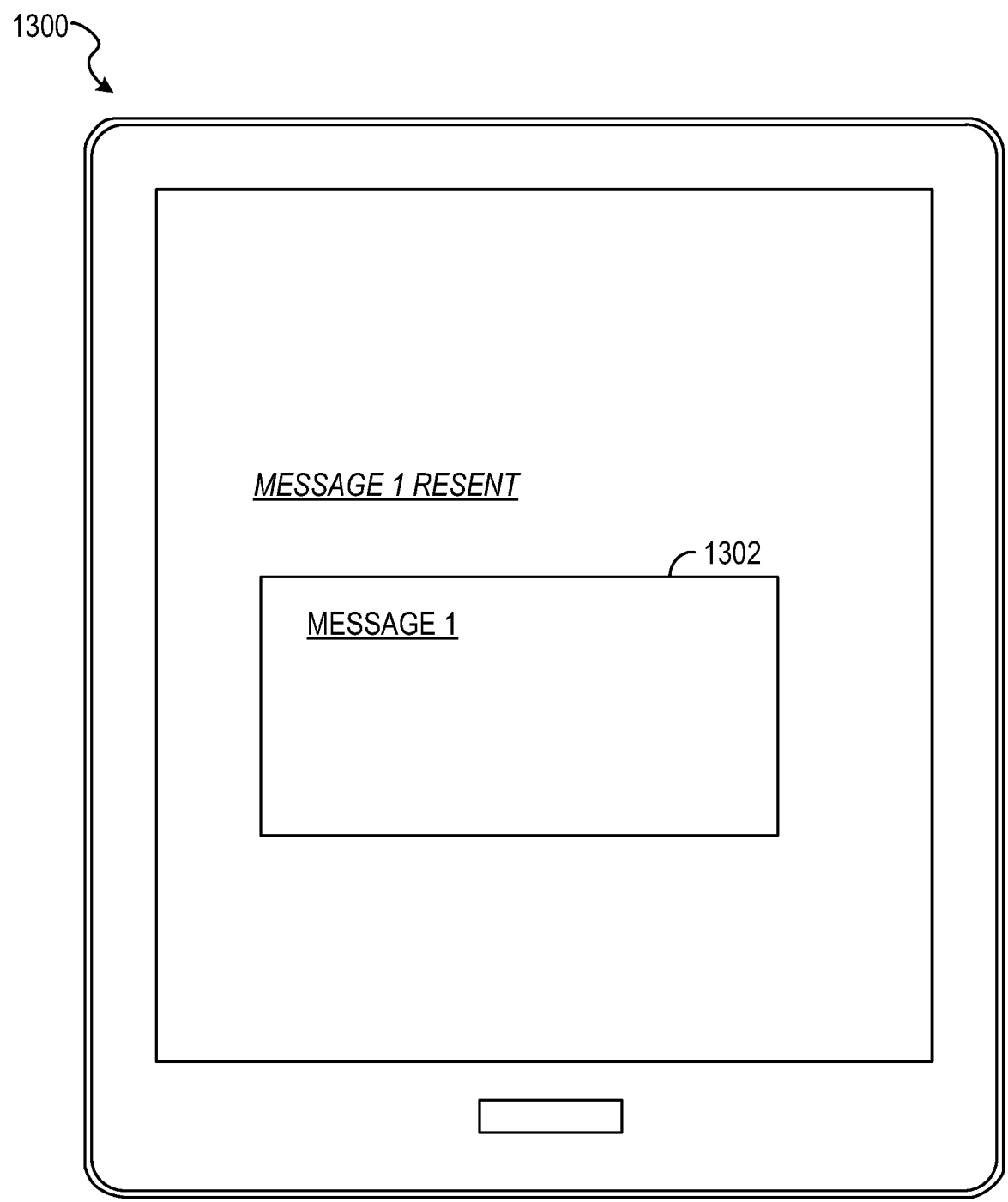

FIG. 13 is an example user interface 1300 of a message application that is displayed on a client device, according to some example embodiments. In various example embodiments, the example user interface 1300 is displayed on the client device after the example user interface 1200 is displayed. As shown, the first message 1302 is transmitted and displayed in the user interface 1300 in response to selection of the trigger 1202.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 14:
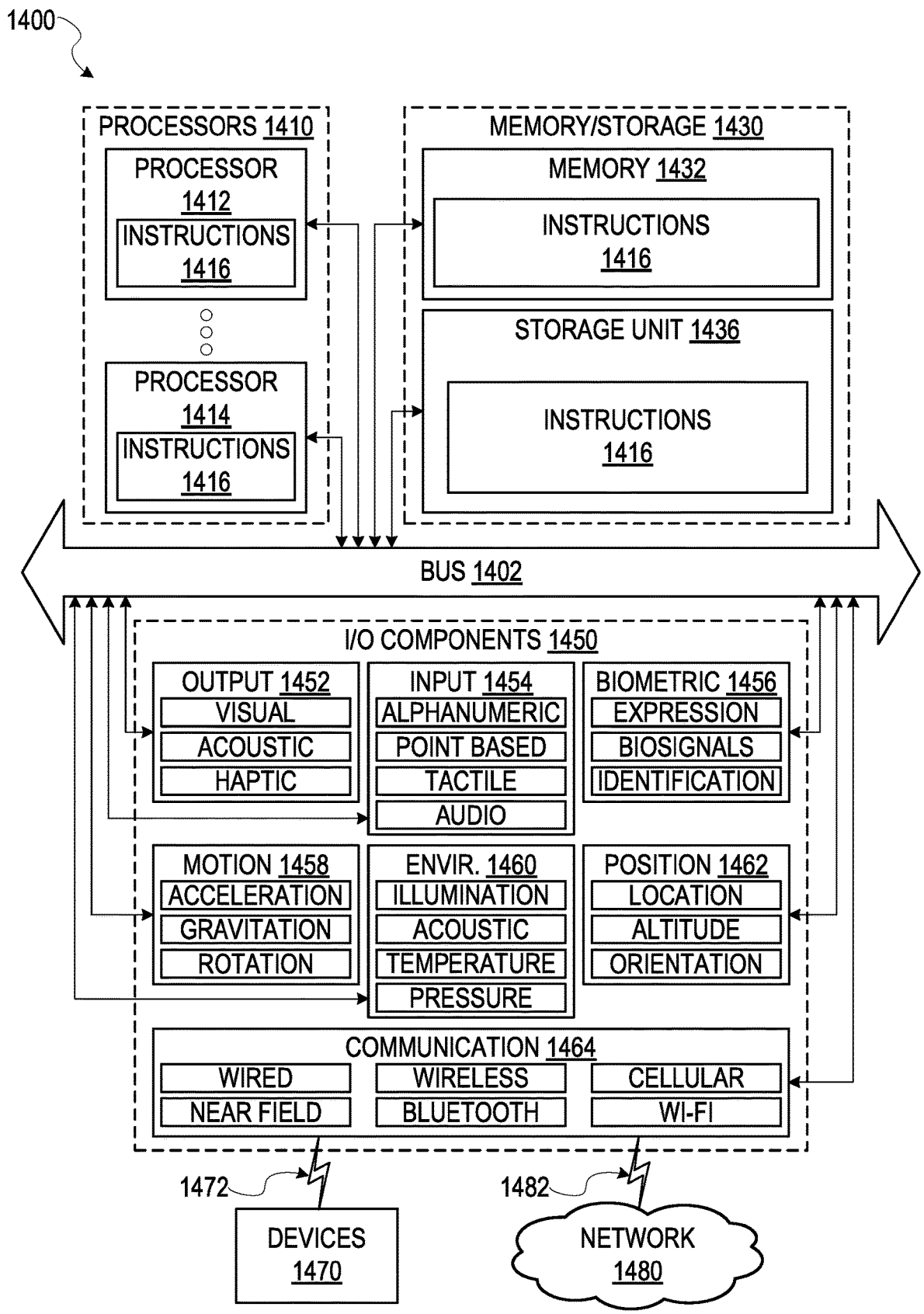
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions transform the general, non-programmed machine into a particular machine specially configured to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include multi-core processor that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core process), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of processors 1410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1482 and coupling 1472 respectively. For example, the communication components 1464 may include a network interface component or other suitable device to interface with the network 1480. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of transmitting one or more messages from a server to one or more client devices based on a message order using message queues, the method comprising:
   receiving, by the server over a network, one or more electronic messages, the one or more messages being addressed to a first user;
   maintaining, by the server, a plurality of message queues, a message queue of the plurality of message queues corresponding to the first user;
   in response to determining, by the server, that the one or more electronic messages is received out of order, sorting the one or more electronic messages into an order in which the one or more electronic messages were created;
   storing, by the server, the sorted one or more messages in the message queue based on the order in which the one or more electronic messages were created;
   determining, using one or more processors of the server, a position of a next message in the message queue to be transmitted to a first client device operated by the first user;
   transmitting, by the server over the network to the first client device operated by the first user, the next message from the determined position in the message queue;
   maintaining, by the server, the next message in the message queue for a predetermined period of time after the transmitting of the next message; and
   preserving, by the server, a position of the next message in the message queue after the transmitting of the next message.

2. The method of claim 1, wherein:
the receiving includes receiving a new electronic message that is addressed to the first user, the message being received from an electronic device operated by a second user; and
the storing includes adding the new message to the message queue, the new message occupying a position in the message queue that comes after a message previously stored into the message queue.

3. The method of claim 1, wherein the message order is based on a timestamp assigned to each message of the one or more messages.

4. The method of claim 1, further comprising:
generating a label that indicates a previously transmitted message sent to the first client device; and
appending the label to the next message from the determined position in the message queue, wherein the transmitting includes transmitting the next message with the appended label.

5. The method of claim 4, further comprising:
receiving a confirmation that the previously transmitted message indicated in the label was received by the first client device, the confirmation being received from the first client device operated by the first user.

6. The method of claim 4, further comprising:
causing display of a trigger that is selectable by the user to confirm that the previously transmitted message was received by the first client device.

7. The method of claim 4, further comprising:
receiving an indication that the previously transmitted message has not been received by the first client device; and
transmitting the previously transmitted message to the first client device without retransmitting the message from the determined position.

8. The method of claim 1, further comprising:
receiving a queue synchronization request from the first client device operated by the first user; and wherein the determining the position of the message is performed based on the queue synchronization request from the first client device.

9. The method of claim 1, further comprising:
receiving a queue synchronization request from a second client device operated by the first user; and wherein the determining includes determining a second position in the generated message queue for the second client device operated by the first user, the second position being different from the position of the next message in the generated message queue for the first client device operated by the first user.

10. The method of claim 9, further comprising transmitting a message from the second position in the generated message queue to the second client device operated by the first user.

11. The method of claim 1, wherein:
the one or more messages include time stamps that indicate their times of composition; and
the storing the one or more messages is based on the time stamps.

12. A system for transmitting one or more messages from a server to one or more client devices based on a message order using message queues, the system comprising:
one or more processors; and
a storage device storing executable instructions that, when executed by the one or more processors, configure the one or more processors to perform operations comprising:

receiving, over a network, one or more electronic messages according to the message order, the one or more messages being addressed to a first user;
maintaining a plurality of message queues, a message queue of the plurality of message queues corresponding to the first user;
storing the one or more messages in the message queue corresponding to the first user based on the received message order;
determining a position of a next message in the generated message queue to be transmitted to a first client device operated by the first user;
generating a label that indicates a previously transmitted message sent to the first client device;
appending the label to the next message from the determined position in the message queue; and
transmitting, over the network, the next message with the appended label from the determined position in the message queue to the first client device operated by the first user.

13. The system of claim 12, wherein the operations further comprise:
receiving a new electronic message that is addressed to the first user, the message being received from an electronic device operated by a second user; and
adding the new message to the message queue, the new message occupying a position in the message queue that comes after a message previously stored into the message queue.

14. The system of claim 12, wherein the operations further comprise:
maintaining the next message in the message queue after the transmitting; and
preserving a position of the next message in the message queue after the transmitting.

15. The system of claim 12, wherein the operations further comprise:
receiving a confirmation that the previously transmitted message indicated in the label was received by the first client device, the confirmation being received from the device operated by the first user.

16. The system of claim 12, wherein the operations further comprise:
causing display of a trigger that is selectable by the user to confirm that the previously transmitted message was received by the first client device.

17. The system of claim 12, wherein the operations further comprise:
receiving an indication that the previously transmitted message has not been received by the first client device; and
transmitting the previously transmitted message to the first client device without retransmitting the message from the determined position.

18. A non-transitory machine-readable medium storing instructions that, when executed by one or more processors of a machine, cause the machine to perform operations for transmitting one or more messages from a server to one or more client devices based on a message order using message queues, the operations comprising:
receiving, over a network, one or more electronic messages according a message order, the one or more messages being addressed to a first user;
maintaining a plurality of message queues, a message queue of the plurality of message queues corresponding to the first user;

storing the one or more messages in the message queue based on the received message order;

determining a position of a next message in the generated message queue to be transmitted to a first client device operated by the first user;

transmitting, over the network, the next message from the determined position in the message queue to the first client device operated by the first user; and receiving a queue synchronization request from a second client device operated by the first user, the determining the position including determining a second position in the generated message queue for the second client device operated by the first user, the second position being different from the position of the next message in the generated message queue for the first client device operated by the first user.

* * * * *